United States Patent
Henry et al.

(10) Patent No.: US 10,849,020 B2
(45) Date of Patent: Nov. 24, 2020

(54) SCHEDULING RELAY OF TRAFFIC BETWEEN ACCESS POINT(S) AND CLIENT DEVICE(S)

(71) Applicant: Cisco Technology, Inc., San Jose, CA (US)

(72) Inventors: Jerome Henry, Pittsboro, NC (US); John George Apostolopoulos, Palo Alto, CA (US); John Martin Graybeal, Califon, NJ (US); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 24 days.

(21) Appl. No.: 16/243,480

(22) Filed: Jan. 9, 2019

(65) Prior Publication Data

US 2020/0221343 A1   Jul. 9, 2020

(51) Int. Cl.
| | | |
|---|---|---|
| *H04W 4/00* | (2018.01) | |
| *H04W 28/10* | (2009.01) | |
| *H04W 24/02* | (2009.01) | |
| *H04W 72/12* | (2009.01) | |
| *H04B 7/14* | (2006.01) | |

(52) U.S. Cl.
CPC .............. *H04W 28/10* (2013.01); *H04B 7/14* (2013.01); *H04W 24/02* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 9,681,337 B2 | 6/2017 | Davis et al. | |
| 9,930,592 B2 | 3/2018 | Hinman | |
| 10,051,543 B2 | 8/2018 | Hans et al. | |
| 2011/0117907 A1* | 5/2011 | Hooli | H04W 72/02 455/422.1 |
| 2013/0286954 A1* | 10/2013 | Ma | H04B 7/024 370/329 |
| 2013/0336199 A1* | 12/2013 | Schwartz | H04B 7/15507 370/315 |

(Continued)

OTHER PUBLICATIONS

Deshpande et al., "Predictive Methods for Vehicular Wifi Access", Citeseerx.ist.psu.edu, Jun. 22-25, 2009, pp. 1-14.

*Primary Examiner* — Bob A Phunkulh
(74) *Attorney, Agent, or Firm* — Patterson + Sheridan, LLP

(57) ABSTRACT

Various embodiments herein disclose scheduling relay of traffic. The method comprises, selecting a second client device from a plurality of client devices. The second client device is located in communication range of the first client device. The first client device is communicating a first portion of a data flow, via a first wireless link, with a first access point of the one or more access points. The method comprises, in response to determining satisfaction of one or more relay criteria: directing the first access point to generate a second wireless link with the second client device; and directing the first access point to provide first metadata including a first set of relay instructions. The first set of relay instructions instructs the second client device to relay a second portion of the data flow between the first access point and the first client device via the second wireless link.

18 Claims, 10 Drawing Sheets

(56) References Cited

U.S. PATENT DOCUMENTS

| | | | |
|---|---|---|---|
| 2014/0098731 A1* | 4/2014 | Maaref | H04W 72/121 |
| | | | 370/312 |
| 2014/0250456 A1* | 9/2014 | Ramkumar | H04N 21/814 |
| | | | 725/33 |
| 2015/0282070 A1* | 10/2015 | Salem | H04W 52/0206 |
| | | | 370/311 |
| 2015/0312788 A1* | 10/2015 | Delsol | H04W 84/047 |
| | | | 370/252 |
| 2015/0382159 A1* | 12/2015 | Kim | H04W 4/80 |
| | | | 370/312 |
| 2015/0382277 A1* | 12/2015 | Ljung | H04W 76/14 |
| | | | 455/445 |
| 2017/0013572 A1* | 1/2017 | Jayaraman | H04W 24/02 |
| 2017/0272507 A1* | 9/2017 | Hotchkiss | H04L 67/16 |
| 2018/0063261 A1 | 3/2018 | Moghe et al. | |
| 2018/0063768 A1* | 3/2018 | Martin | H04W 36/30 |
| 2019/0098698 A1* | 3/2019 | Fukuta | H04W 36/03 |
| 2019/0174411 A1* | 6/2019 | Xu | H04W 76/28 |

* cited by examiner

900 ⬊

910
Obtain a common group identifier from a subset of client devices including first and second client devices

↓

920
Designate each of the subset of client devices as a candidate relay device

↓

930
Set a particular data relay encryption level for each of the candidate relay devices

↓

940
Select the second client device in communication range of the first client device that is communicating a first portion of a data flow with a first access point

↓

950
In response to determining satisfaction of one or more relay criteria:
    direct the first access point to generate a second wireless link with the second client device; and
    direct the first access point to provide first metadata including a first set of relay instructions according to the particular data relay encryption level

FIG. 9

SCHEDULING RELAY OF TRAFFIC BETWEEN ACCESS POINT(S) AND CLIENT DEVICE(S)

TECHNICAL FIELD

The present disclosure relates generally to wireless networking, and in particular, scheduling relay of traffic between access point(s) and client device(s).

BACKGROUND

The number of wireless data applications running on the electronic devices is large and increasing. Accordingly, the corresponding amount of wireless data communicated between the electronic devices is large and increasing, leading to network congestion. Moreover, the frequency ranges over which the electronic devices communicate with each other provide low throughput levels and have become crowded. Consequently, network congestion, coupled with low throughput signaling, hinder the electronic devices from communicating with each other at desirable data rates.

High frequency signaling enables higher throughput and is generally less crowded. High frequency signaling, nevertheless, has intrinsic features that make wireless communications challenging. For example, physical obstacles adversely affect higher frequency signals to a greater degree. Moreover, a higher carrier frequency results in a higher path loss, reducing coverage area associated with the signal. A smaller coverage area is particularly challenging for a mobile device, because the mobile device often remains in the small coverage area for a limited period of time. Consequently, the mobile device may not communicate adequate amounts of data while in the coverage area.

BRIEF DESCRIPTIONS OF THE DRAWINGS

For a better understanding of aspects of the various embodiments described herein and to show more clearly how they may be carried into effect, reference is made, by way of example only, to the accompanying drawings.

FIG. 9 is a flowchart representation of a method of utilizing a common group identifier in scheduling relay of traffic accordance with some embodiments.

Figure 1:
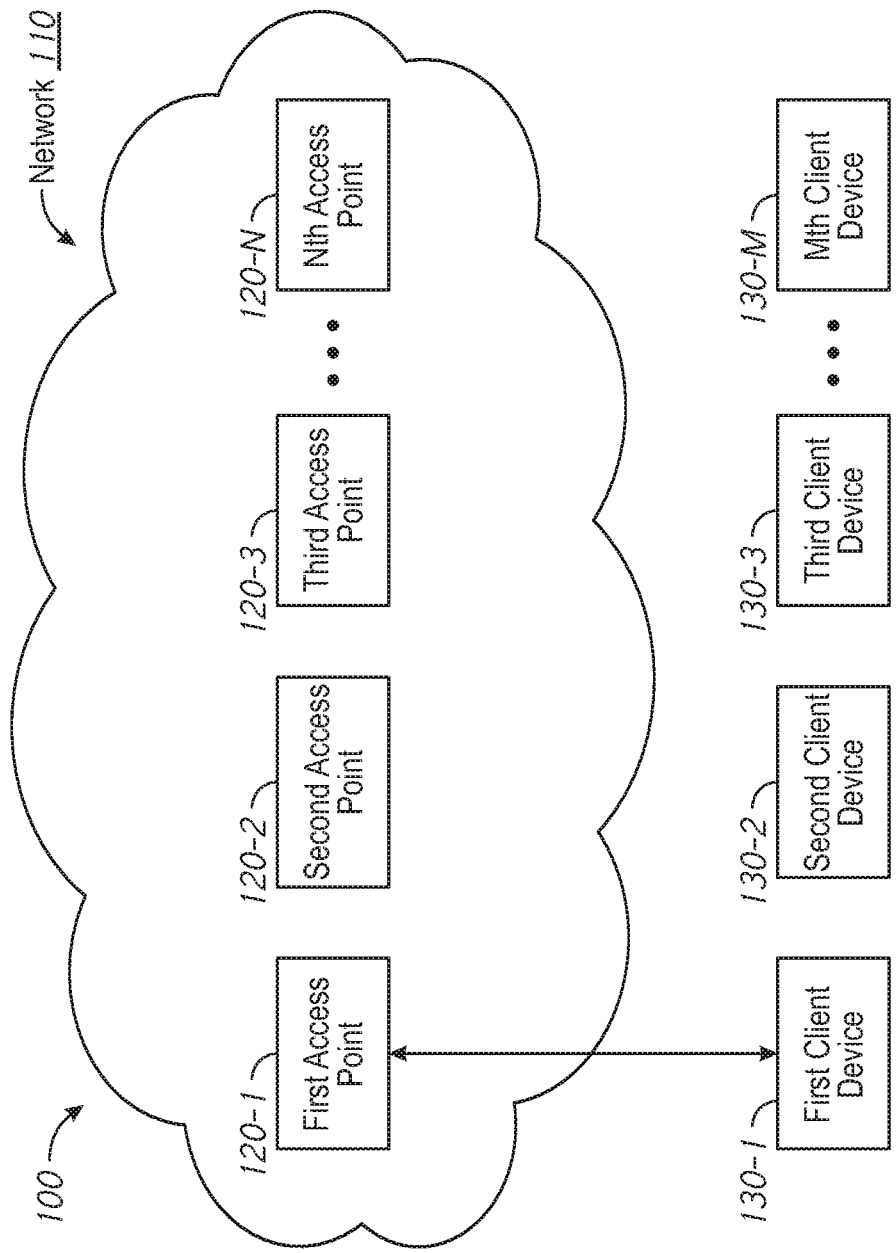
FIG. 1 is a block diagram of an example of a networking environment including an access point communicating with a client device that is proximate to other client device(s).

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative embodiments shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the embodiments described herein.

Overview

Various embodiments disclosed herein include apparatuses, systems, devices, and methods for scheduling relay of traffic between access point(s) and client device(s). The method comprises, selecting a second client device from a plurality of client devices. The second client device is located in communication range of a first client device of the plurality of client devices. The first client device is communicating a first portion of a data flow, via a first wireless link, with a first access point of the one or more access points. The method further comprises, in response to determining satisfaction of one or more relay criteria: directing the first access point to generate a second wireless link with the second client device; and directing the first access point to provide first metadata including a first set of relay instructions. The first set of relay instructions instructs the second client device to relay a second portion of the data flow between the first access point and the first client device via the second wireless link.

In accordance with some embodiments, a traffic scheduler includes one or more communication interfaces, one or more processors, a non-transitory memory, and one or more programs. The one or more programs are stored in the non-transitory memory and configured to be executed by the one or more processors, and the one or more programs include instructions for performing or causing performance of any of the methods described herein. In accordance with some embodiments, a non-transitory computer readable storage medium has stored therein instructions, which, when executed by one or more processors of a traffic scheduler, cause the traffic scheduler to perform or cause performance of any of the methods described herein. In accordance with some embodiments, a traffic scheduler includes: a communication interface, one or more processors, a non-transitory memory, and means for performing or causing performance of any of the methods described herein.

EXAMPLE EMBODIMENTS

Wireless communications between network devices, including between client device(s) (e.g., mobile devices, AR/VR devices, vehicle sensors, etc.) and access point(s), have become ubiquitous. For example, vehicle-to-infrastructure and vehicle-to-vehicle communications, sometimes collectively referred to as V2X communications, are becoming increasingly prevalent. Another example is smart cities that include Internet of things (IoT) sensors located inside, on, outside, and/or around physical structures. Wireless communications between network devices often involve communication of a large amount of data (e.g., traffic). Examples of large data sets include high-resolution streaming multimedia content (e.g. movies, video conferencing, AR/VR content, etc.), high-definition maps for self-driving cars, detailed analytics about engine performance, etc.

However, a network deployment often provides an insufficient wireless coverage area to facilitate communicating a desirable amount of data between client devices. The insufficient wireless coverage area may be due to a number of factors including, but not limited to: an inadequate number of access points in a given area; too many client devices operating in a given area, causing congestion; physical obstructions between client devices and access points (e.g., buildings, bridges, etc.); atmospheric obstructions (e.g., moisture, humidity, and/or the like); movement of a client device outside of a wireless coverage area before completion of a desired portion of a data flow; and/or a combination thereof. For example, if a moving vehicle going over a bridge includes a networking device that is downloading (e.g., streaming) a movie file, the networking device in the vehicle may not receive a desired portion of the movie file because of too few access points on the bridge providing the desired portion of the movie file, physical impediments between the vehicle and the bridge (e.g., other vehicles, buildings), and/or because the vehicle is moving too fast to enable completion of the desired portion of the movie file prior to the vehicle moving beyond the wireless coverage area provided by the access point(s).

Moreover, a network deployment often operates within a particular frequency spectrum that limits data communications between network devices. Wireless communications propagating at lower frequencies generally provide less data throughput, and therefore a corresponding network deployment may not be equipped to facilitate larger data communications. Moreover, as the number of devices operating in a particular frequency spectrum increase, the communication channels become more crowded, leading to more congestion and therefore reduced communication performance (e.g., more distortion, higher bit error rate (BER), etc.)

In order to combat the shortcomings of existing network deployments, in accordance with various embodiments disclosed herein, systems, apparatuses, methods, and devices enable scheduling relay of traffic between access point(s) and client device(s). Various embodiments disclose scheduling relay, via a client device, of a portion of a data flow between an access point and another client device that would otherwise be unable to transfer and/or receive the portion of the data flow. For example, in some embodiments, based on satisfaction of one or more relay criteria, a wireless link is generated between a client device and an access point, and the client device is provided with relay instructions that instruct the client device to relay a portion of a data flow from the access point to another client device. In some embodiments, numerous access points and/or numerous client devices are instructed to relay different portions of the data flow to another client device. Accordingly, problems arising from client device(s) operating in an inadequate wireless coverage area and/or within a problematic frequency spectrum are ameliorated.

According to various embodiments disclosed herein, portions of a data flow are relayed via a high frequency wireless link between an access point and a client device, resulting in greater data throughput. Scheduling relay of traffic combats inherent challenges of high frequency signaling, including greater susceptibility to blockages due to narrow beam width, higher path loss due to higher carrier frequency, and reduced scattering and therefore reduced available diversity. Various embodiments disclosed herein utilize one or more of the following non-exhaustive types of high frequency signaling: unlicensed cellular (e.g., LTE-unlicensed); International Telecommunication Union (ITU) defined extremely high frequency (EHF) of 30-300 GHz; mid-band frequency links with wide bandwidths, such as a 5G NR link centered at approximately 2.5 GHz with a frequency carrier bandwidth of less than or equal to approximately 50 MHz; millimeter wave (mmWave) links; mmWave links in conjunction with technologies such as 5G NR, 802.11ad, 802.11ay, 802.16, etc.; and/or signaling via optical communication links in conjunction with technologies such as Li-Fi, etc.

FIG. 1 is a block diagram of an example of a networking environment 100 including an access point communicating with a client device that is proximate to other client device(s). While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the networking environment 100 includes a wireless network 110, access points 120-1-120-N, and client devices 130-1-130M.

In some embodiments, the wireless network 110 is characterized by an IEEE 802-based technology, such as a Wi-Fi network. In some embodiments, the wireless network 110 is characterized by a 3GPP defined cellular technology, such as an 4G, LTE, and/or 5G network. In some embodiments, the wireless network 110 is characterized by multiple radio access technologies (RATs), sometimes referred to as a heterogenous network. For example, in some embodiments, the wireless network 110 includes Wi-Fi access points and cellular access points (e.g., cellular base stations).

The networking environment 100 includes access points 120-1-120-N. In various embodiments, the access points 120-1-120-N provide the client devices 130-1-130-M connectivity to the wireless network 110. Each of the access points 120-1-120-N may correspond to one of a variety of types of wireless access points, such as a cellular base station or an unlicensed-band access point. Particular functionality of the wireless base station may be implemented in accordance to specific standards, and the wireless base station may in turn be referred to by other names particular to specific standards. For example, in some LTE-based embodiments, the wireless base station corresponds to an eNodeB (providing coverage to a client device within a cellular network), or a home eNodeB (HeNodeB) providing a femtocell coverage area within a building. As another example, in some 5G-based embodiments, the wireless base station corresponds to a gNodeB, having similar functionality as an eNodeB.

In various embodiments, the access points 120-1-120-N are proximate to each other. For example, in some embodiments, the access points 120-1-120-N are positioned on a temporal connection point, such as being located on the same bridge, same overpass, or on the outside of a particular building.

The networking environment 100 includes client devices 130-1-130-M. In some embodiments, a particular one of the client devices 130-1-130-M corresponds to a user equipment (UE), such as a smartphone, laptop, tablet, IoT sensor, vehicular device, AR/VR device, etc. For example, in some embodiments, some of the client devices 130-1-130-M each corresponds to a vehicular device included within a respective vehicle that is configured to communicate with the access points 120-1-120-N and/or with some or all of the other vehicular devices. Examples of vehicular devices are: a vehicle sensor that detects one or more respective statuses of the vehicle (e.g., low oil level, malfunctioning brakes); a vehicular entertainment device (e.g., plays video content streamed from access points), a vehicular navigation device (e.g., obtains traffic updates and latest maps from access points); a vehicular group communication device (e.g., fleet of proximate semi-trucks communicate with each other via digital short range communications (DSRC)); and/or the like.

As illustrated in FIG. 1, the first access point 120-1 is wirelessly communicating a portion of a data flow with the first client device 130-1. However, under a variety of circumstances, such as explained below with respect to FIGS. 2-4, the first access point 120-1 cannot communicate a desirable amount (e.g., portion) of a data flow with the first client device 130-1. In order to address the inadequate communication of the data flow between the first access point 120-1 and the first client device 130-1, various embodiments disclose a traffic scheduler that schedules additional client device(s) to relay portions of the data flow to the first client device 130-1.

Figure 2:
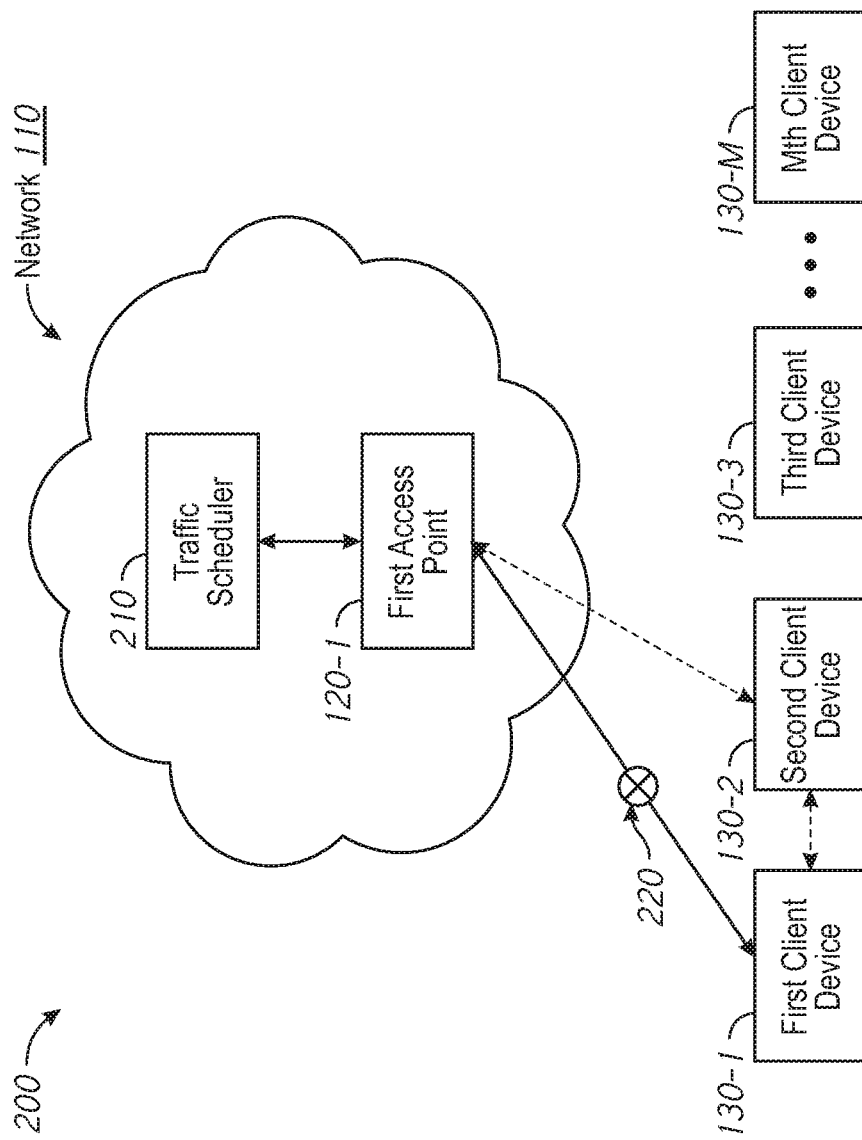
FIG. 2 is a block diagram of an example of a networking environment including a traffic scheduler in accordance with some embodiments.

FIG. 2 is a block diagram of an example of a networking environment 200 including a traffic scheduler in accordance with some embodiments. The networking environment 200 includes a wireless network 110, a traffic scheduler 210, a first access point 120-1, client devices 130-1-130-M, and a data flow communication impediment 220. A single access point 120-1 is illustrated in FIG. 2 for ease of explanation, however one of ordinary skill in the art will appreciate that other embodiments include additional access points included within the wireless network 110 that each wirelessly communicate with the client devices 130-1-130-M.

In some embodiments, the traffic scheduler 210 corresponds to a network controller, such as a combination of one or more of: a wireless LAN controller (WLC), a cloud controller, an intent-based network controller (e.g., Cisco's digital network architecture (DNA)), a distributed controller, an edge cloud controller, or a cloud RAN sometimes referred to as a centralized RAN. In some embodiments, although not depicted in FIG. 2, the traffic scheduler 210 is integrated within the access point 120-1. In some embodiments, the traffic scheduler 210 is proximate to the access point 120-1 in order to reduce latency. In some embodiments, the traffic scheduler 210 corresponds to or includes a data feed server.

As illustrated in FIG. 2, the first access point 120-1 is wirelessly communicating a portion of a data flow with the first client device 130-1 via a first wireless link. For example, in some embodiments, the first client device 130-1 corresponds to a moving vehicle that is receiving, from the first access point 120-1 mounted on a bridge, traffic updates including a recommended alternative route because of an accident ahead. However, the data flow communication impediment 220 impedes communication of a portion of the traffic update data flow between the first access point 120-1 and the first client device 130-1. Accordingly, the first client device 130-1 is unable to receive the entire traffic update due to the data flow communication impediment 220, and may need to wait until the next temporal connection point (e.g., the next bridge, overpass) to receive the remainder of the traffic update. As a result, the first client device 130-1 may not receive the entire traffic update in time in order to alert the driver of the vehicle to take a detour to avoid the accident.

In some embodiments, the data flow communication impediment 220 corresponds to a physical obstruction, such as a building, vehicle, etc., located between the first access point 120-1 and the first client device 130-1. In embodiments including a high frequency wireless link between the first access point 120-1 and the first client device 130-1, physical obstructions are especially problematic because high frequency signaling is particularly susceptible to blockages due to lower diffraction of the high frequency signal.

In some embodiments, the data flow communication impediment 220 corresponds to atmosphere conditions that affect communication of the data flow. These atmosphere conditions include, but are not limited to: humidity, precipitation, temperature, pressure, atmospheric attenuation due to oxygen absorption, and/or the like.

In some embodiments, the data flow communication impediment 220 corresponds to a mobility event of the mobile first client device 130-1. Continuing with the previous example, the client device 130-1 is included within a vehicle that is traveling on a bridge on which the first access point 120-1 is mounted. However, due to the high speed of the vehicle and/or the large amount of data to be communicated, the client device 130-1 is unable to complete communication with the first access point 120-1 before the client device 130-1 moves outside of a coverage area provided by the first access point 120-1. Although not depicted, in some embodiments, the data flow communication impediment 220 corresponds to a mobility event of the client device 130-1 that results in inadequate communication of the data flow between the client device 130-1 and multiple access points providing respective portions of the data flow to the client device 130-1.

In some embodiments, the data flow communication impediment 220 corresponds to a combination of one or more physical obstructions, one or more atmosphere conditions, or one or more mobility events.

As noted above, the data flow communication impediment 220 impedes communication between the first access point 120-1 and the client device 130-1. In various embodiments, the traffic scheduler 210 obtains, from the first access point 120-1, indicators indicating the extent to which the communication is impeded, and determines whether one or more relay criteria are satisfied based on the indicators. As will be detailed below, in response to determining that the one or more relay criteria are satisfied, the traffic scheduler 210 schedules relay of a portion of the data flow to and/or from the first client device 130-1 via a second client device 130-2 that is within communication range of the first client device 130-1. For example, as illustrated in FIG. 2, the traffic scheduler 210: directs the first access point 120-1 to generate a second wireless link with the second client device 130-2; and directs the first access point 120-1 to provide relay instructions to the second client device 130-2 instructing the second client device 130-2 to relay an additional portion of the data flow to the first client device 130-1.

Figure 3:
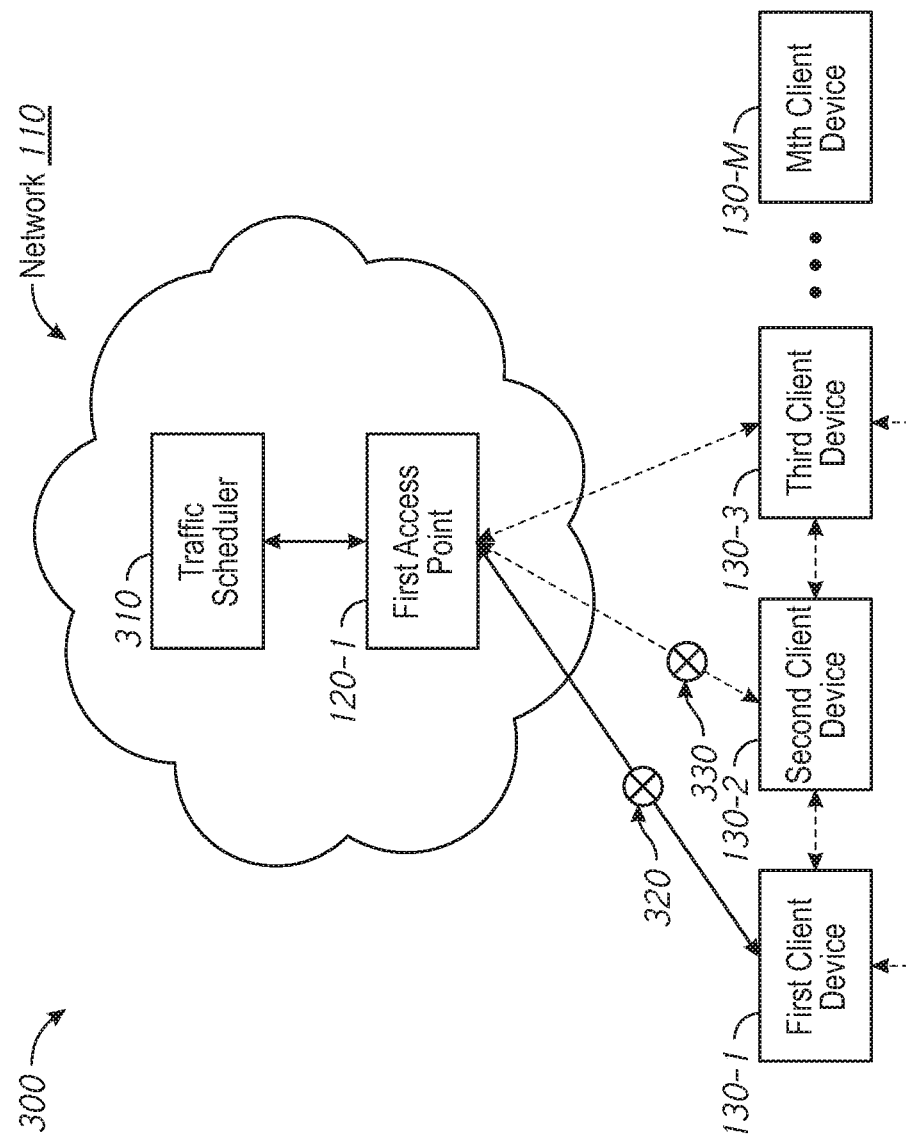
FIG. 3 is a block diagram of an example of a networking environment utilizing multiple client devices for relaying traffic in accordance with some embodiments.

FIG. 3 is a block diagram of an example of a networking environment 300 utilizing multiple client devices for relaying traffic in accordance with some embodiments. The networking environment 300 includes a wireless network 110, a traffic scheduler 310, a first access point 120-1, client devices 130-1-130-M, a first data flow communication impediment 320, and an optional second data flow communication impediment 330. A single access point 120-1 is illustrated in FIG. 3 for ease of explanation, however one of ordinary skill in the art will appreciate that other embodiments include additional access points included within the wireless network 110 that each wirelessly communicate with the client devices 130-1-130-M. In some embodiments, the traffic scheduler 310 is similar to and adapted from the traffic scheduler 210 in FIG. 2. According to various embodiments, the data flow communication impediments 320 and 330 are similar to the data flow communication impediment 220 illustrated in FIG. 2.

As illustrated in FIG. 3, the first access point 120-1 is wirelessly communicating a portion of a data flow with the first client device 130-1 via a wireless link. However, the first data flow communication impediment 320 impedes communication of a portion of the data flow between the first access point 120-1 and the first client device 130-1, whereas the second data flow communication impediment 330 impedes communication of a portion of the data flow between the first access point 120-1 and the second client device 130-2. In response to determining satisfaction of one or more relay criteria resulting from the impediment(s), the traffic scheduler 310 schedules the second client device 130-2 to relay a portion of the data flow to the first client device 130-1.

In order to further reduce the adverse effects of the data flow communication impediments 320 and 330 and improve the overall data throughput, in some embodiments the traffic scheduler 310 schedules a third client device 130-3 to relay an additional portion of the data flow to the first client device 130-1. In some embodiments, the traffic scheduler 310 detects that the third client device 130-3 is within communication range of both the first client device 130-1 and the second client device 130-2, and schedules the third client device 130-3 to relay the portion of the data flow to either or both the first client device 130-1 and the second client device 130-2. In some embodiments, the traffic scheduler 310 detects that the third client device 130-3 is within communication range of the second client device 130-2 but not the first client device 130-1, and schedules the third client device 130-3 to relay portion of the data flow to the second client device 130-2. In some embodiments, the traffic scheduler 310 schedules the third client device 130-3 to relay a portion of the data flow to the first client device 130-1 in response to determining that one or both of the first client device 130-1 and the second client device 130-2 have moved or will imminently move outside communication range of the first access point 120-1.

Figure 4:
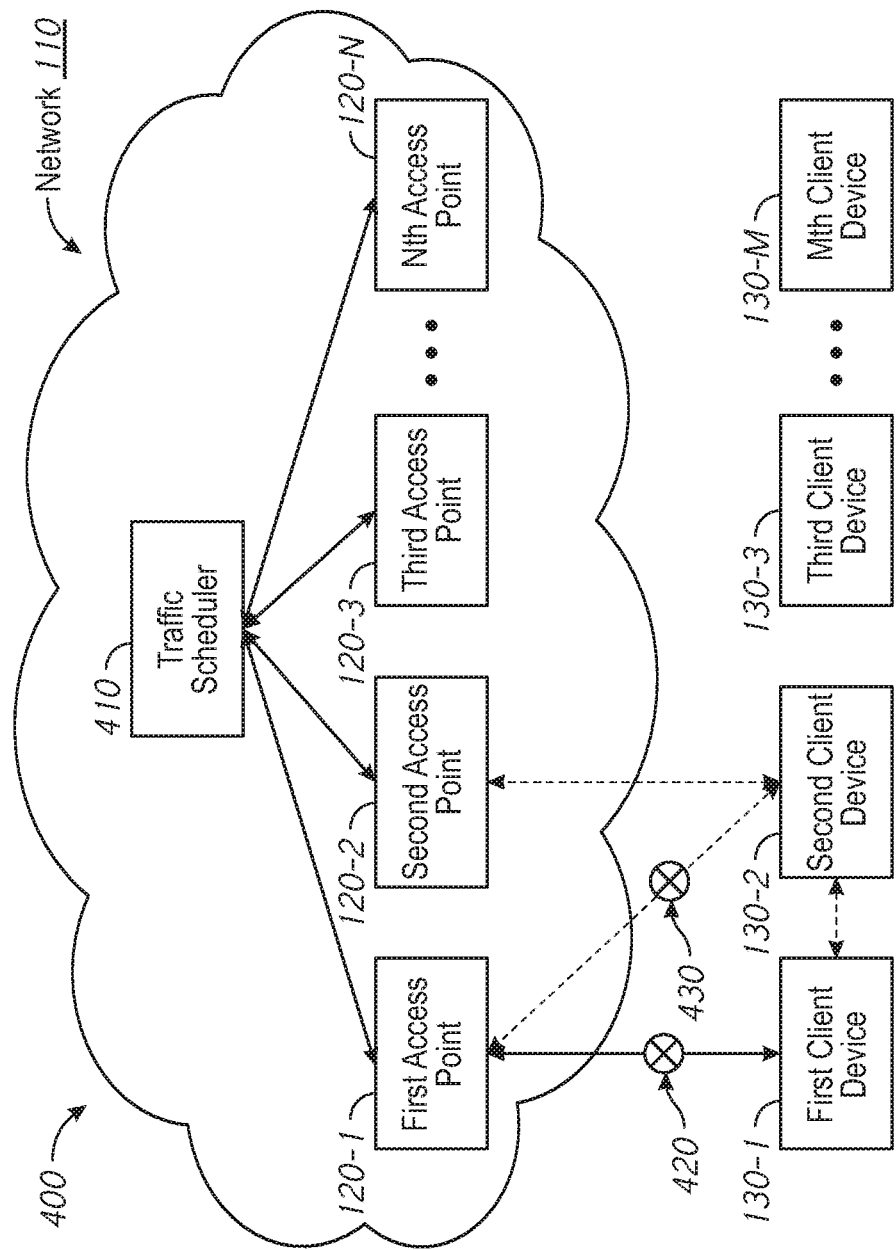
FIG. 4 is a block diagram of an example of a networking environment utilizing multiple access points for relaying traffic in accordance with some embodiments.

FIG. 4 is a block diagram of an example of a networking environment 400 utilizing multiple access points for relaying traffic in accordance with some embodiments. The networking environment 400 includes a wireless network 110, a traffic scheduler 410, access points 120-1-120-N, client devices 130-1-130-M, a first data flow communication impediment 420, and an optional second data flow communication impediment 430. In some embodiments, the traffic scheduler 410 is similar to and adapted from the traffic scheduler 210 in FIG. 2 and/or the traffic scheduler 310 in FIG. 3. According to various embodiments, the data flow communication impediments 420 and 430 are similar to one or more of the data flow communication impediment 220 illustrated in FIG. 2, and/or the first and second communication impediments 320 and 330 illustrated in FIG. 3.

As illustrated in FIG. 4, the first access point 120-1 is wirelessly communicating a portion of a data flow with the first client device 130-1 via a wireless link. However, the first data flow communication impediment 420 impedes communication of a portion of the data flow between the first access point 120-1 and the first client device 130-1, whereas the second data flow communication impediment 430 impedes communication of a portion of the data flow between the first access point 120-1 and the second client device 130-2. In response to determining satisfaction of one or more relay criteria resulting from the first data flow communication impediment 420 and/or the second data flow communication impediment 430, the traffic scheduler 410 schedules the second client device 130-2 to relay a portion of the data flow to the first client device 130-1 via a wireless link with the first access point 120-1.

In order to further reduce the adverse effects of the data flow communication impediments 420 and 430 and improve the overall data throughput, in some embodiments the traffic scheduler 410 directs a second access point 120-2 to instruct the second client device 130-2 to relay an additional portion of the data flow to the first client device 130-1. In some embodiments, in response to determining satisfaction of one or more handoff criteria, the traffic scheduler 410: directs the first access point 120-1 to terminate the wireless link with the second client device 130-2; directs the second access point 120-2 to generate a wireless link with the second client device 130-2; and directs relaying of a portion of the data flow to the first client device 130-1 via the second access point 120-2 and the second client device 130-2.

In some embodiments, the one or more handoff criteria include relative respective communication performance criteria corresponding to the access points 120-1-120-N. For example, in some embodiments, the second access point 120-2 wirelessly communicates at a greater bandwidth than does the first access point 120-1, and therefore utilizing the second access point 120-2 for relaying purposes instead of the first access point 120-1 increases the overall data bandwidth associated with the relaying. For instance, the first access point 120-1 communicates via 2.4 GHz Wi-Fi, whereas the second access point 120-2 communicates according to higher frequency and therefore higher bandwidth mmWave signaling, such as at 28 GHz.

Figure 5:
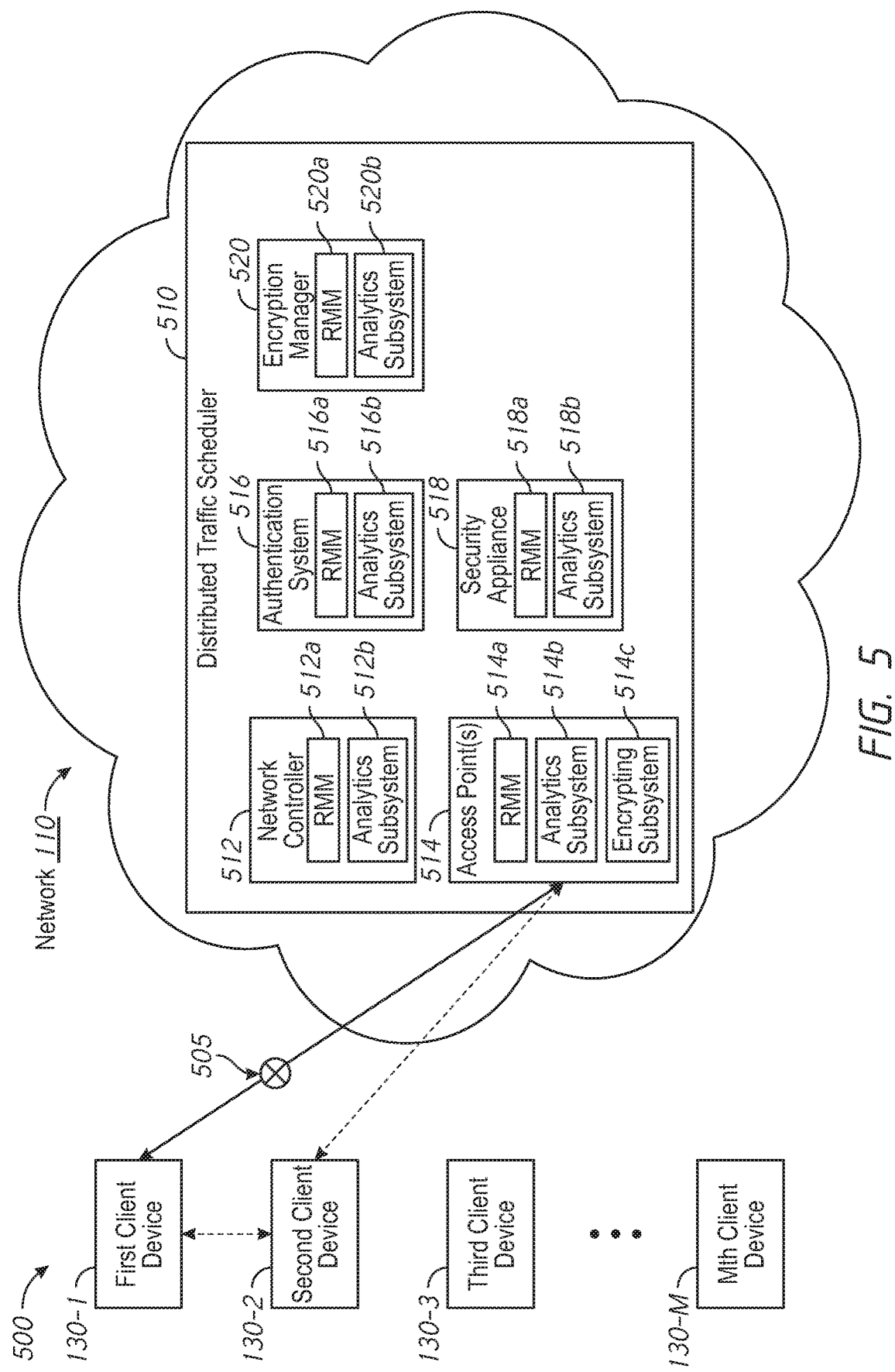
FIG. 5 is a block diagram of an example of a networking environment including a distributed traffic scheduler in accordance with some embodiments.

FIG. 5 is a block diagram of an example of a networking environment 500 including a distributed traffic scheduler in accordance with some embodiments. The networking environment 500 includes a wireless network 110, a distributed traffic scheduler 510, client devices 130-1-130-M, and a data flow communication impediment 505. In some embodiments, portions of the distributed traffic scheduler 510 are similar to and adapted from the traffic scheduler 210 in FIG. 2, the traffic scheduler 310 in FIG. 3, and/or the traffic scheduler 410 in FIG. 4. According to various embodiments, the data flow communication impediment 505 is similar to one or more of the data flow communication impediment 220 illustrated in FIG. 2, the first and second communication impediments 320 and 330 illustrated in FIG. 3, and/or the first and second communication impediments 420 and 430 illustrated in FIG. 4.

The distributed traffic scheduler 510 includes a network controller 512, one or more access points 514, an authentication system 516, a security appliance 518, and an encryption manager 520. One of ordinary skill in the art will appreciate that, in some embodiments, the distributed traffic scheduler 510 includes fewer or greater of the network components illustrated in FIG. 5.

In some embodiments, the network controller 512 manages the one or more access points 514. In some embodiments, the network controller 512 includes a combination of one or more of: a wireless LAN controller (WLC), a cloud controller, an intent-based network controller (e.g., Cisco's digital network architecture (DNA)), a distributed controller, an edge cloud controller, or a cloud RAN sometimes referred to as a centralized RAN. In some embodiments, the network controller 512 includes a resource management module (RMM) 512a and/or an analytics subsystem 512b that are configured to provide management of data on each of the client devices 130-1-130-M sharing one or more network resources. For example, in some embodiments, the RMM 512a and/or the analytics subsystem 512b are configured to monitor traffic to and/or from the client devices 130-1-130-M and determine respective resource utilization values that are each representative of how much of a network resource is being utilized by a particular client device. In various embodiments, as illustrated in FIG. 5, additional networking devices in the wireless network 110 also include respective RMMs and/or analytics subsystems that may cooperative with each other in order to provide resource management and data analytics.

The distributed traffic scheduler 510 further includes the authentication system 516. In some embodiments, the authentication system 516 corresponds to a layer two (L2) authentication server (e.g., AAA/RADIUS server), such as one commonly found in an enterprise deployment.

The distributed traffic scheduler 510 further includes the security appliance 518 (e.g., a server) that protects the wireless network 110 from unwanted and/or harmful traffic. For example, in some embodiments, the security appliance 518 includes a firewall, an antivirus scanning device, a content filtering device, an intrusion selection system, a prevention scanning device (e.g., penetration tester, vulnerability assessment system), or a combination thereof.

The distributed traffic scheduler 510 further includes the encryption manager 520. The encryption manager 520 manages data encryption (e.g., via encryption keys) for various data flows communicated between client devices and access points. In some embodiments, the encryption manager 520 encrypts data communicated with a subset of client devices based on a common group identifier obtained from the subset of client devices.

According to various embodiments, scheduling relay of traffic between the one or more access points 514 and the one or more client devices 130-1-130-M is distributed among the components of the distributed traffic scheduler 510. For example, in some embodiments, generating a wireless link between a particular access point and the second client device 130-2 for relaying purposes is in response to the authentication system 516 authenticating the credentials of the second client device 130-2. As another example, in some embodiments, relay instructions provided to a particular client device include encryption information (e.g., an encryption key) generated and provided by the encryption manager 520 in order to facilitate an encrypted data flow. As yet another example, in some embodiments, generating a wireless link between a particular access point and a particular client device for relaying purposes is in response to the security appliance 518 determining that the particular client device has the latest antivirus definition files installed.

Figure 6:
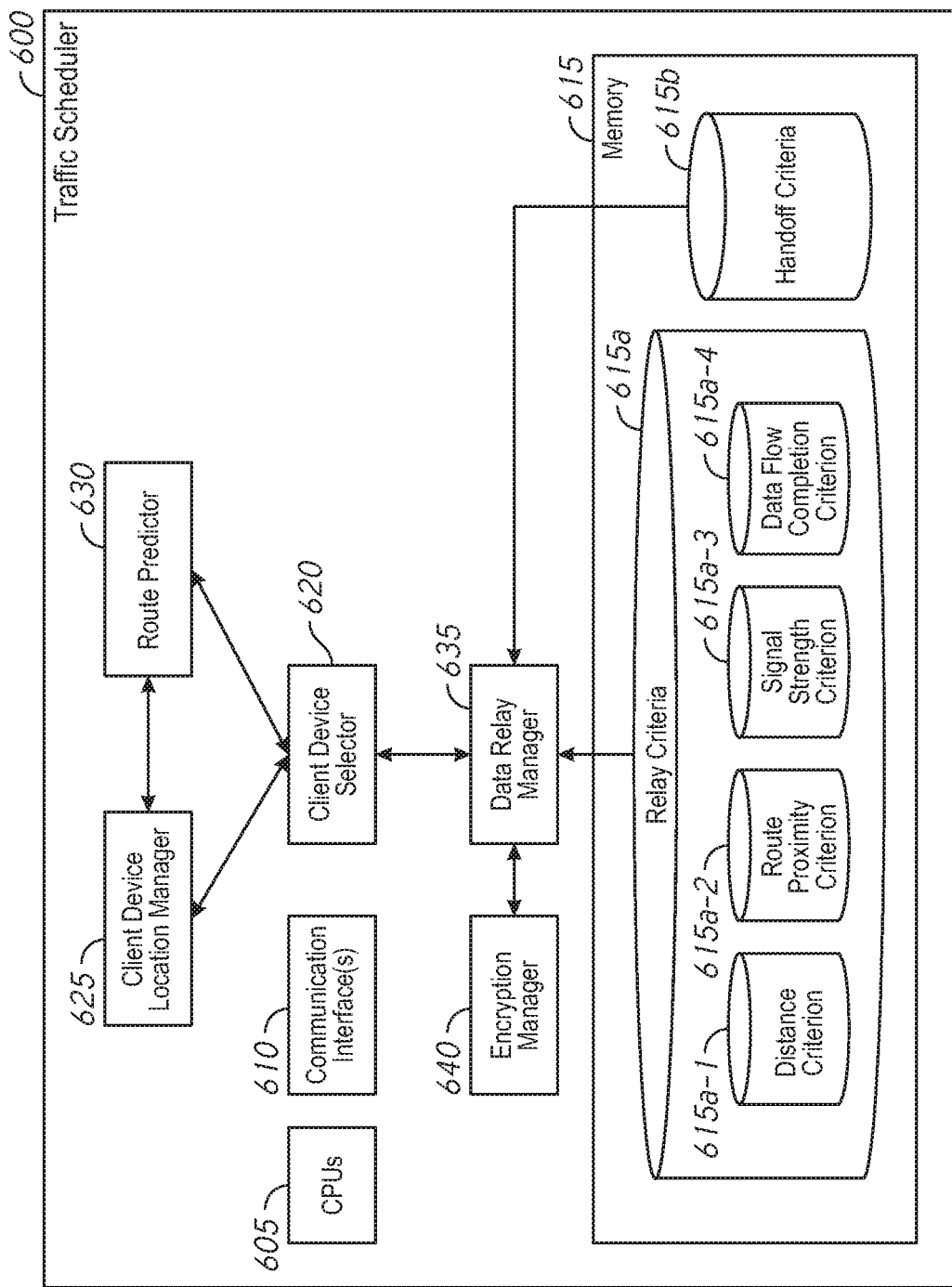
FIG. 6 is a block diagram of a traffic scheduler in accordance with some embodiments.

FIG. 6 is a block diagram of a traffic scheduler 600 in accordance with some embodiments. In some embodiments, portions of the traffic scheduler 600 are similar to and adapted from the traffic scheduler 210 in FIG. 2, the traffic scheduler 310 in FIG. 3, the traffic scheduler 410 in FIG. 4, and/or the distributed traffic scheduler 510 in FIG. 5.

The traffic scheduler 600 includes one or more CPUs 605. In various embodiments, the one or more CPUs 605 provide processing resources for scheduling relay of traffic between access point(s) and client device(s).

The traffic scheduler 600 further includes communication interface(s) 610 that provide an input/output interface for scheduling relay of traffic between access point(s) and client device(s). In some embodiments, the communication interface(s) 610 facilitate communication between the traffic scheduler 600 and one or more access points. For example, in some embodiments, through the communication interface(s) 610 the traffic scheduler 600 provides link generation directions and relay instructions to the access points, and obtains communication performance level indicators from the access points.

The traffic scheduler 600 further includes a memory 615. In various embodiments, the memory 615 corresponds to a non-transitory memory, such as RAM, ROM, etc.

The traffic scheduler 600 includes a client device selector 620 to select a second client device from a plurality of client devices. The second client device is located in communication range of a first client device of the plurality of client devices. The first client device is communicating a first portion of a data flow, via a first wireless link, with a first access point of one or more access points. In some embodiments, the client device selector 620 selects, from the plurality of client devices, a third client device.

In some embodiments, the client device selector 620 operates in conjunction with a client device location manager 625 and/or a route predictor 630. In some embodiments, the client device location manager 625 obtains first location information that indicates a location of the first client device, and obtains second location information that indicates a location of the second client device. The client device selector 620 selects the second client device based on determining that the first and second location information collectively indicate that a distance between the first and second client devices satisfies a distance criterion 615a-1 allocated in memory 615. In some embodiments, the route predictor 630 determines first historical information about the first location information based on changes in the first location information, and determines second historical information about the second location information based on changes in the second location information. Based on the first and second historical information, the route predictor 630 determines respective predicted routes for the first and second client devices. In some embodiments, the client device selector 620 utilizes the first and second predicted routes in selecting the second client device. For example, in some embodiments, the client device selector 620 selects the second client device based on determining that the first and second predicted routes satisfy a route proximity criterion 615a-2 allocated in memory 615. As one example, the client device selector 620 selects the second client based on determining that the first and second predicted routes indicate that the corresponding first and second client devices are moving in the same direction, such as residing within two respective vehicles traveling the same direction on a highway.

The traffic scheduler 600 includes a data relay manager 635 to manage relaying data between access point(s) and client device(s). The data relay manager 635, in response to determining satisfaction of one or more relay criteria 615a allocated in the memory 615: directs the first access point to generate a second wireless link with the second client device; and directs the first access point to provide first metadata including a first set of relay instructions. In some embodiments, the one or more relay criteria 615a include a distance criterion 615a-1, a route proximity criterion 615a-

2, a signal strength criterion 615*a*-3, and/or a data flow completion criterion 615*a*-4. The nature and operation of the one or more relay criteria 615*a* will be further detailed, below. The first set of relay instructions instructs the second client device to relay a second portion of the data flow between the first access point and the first client device via the second wireless link. In some embodiments, the first set of relay instructions instructs the second client device to establish a communication link with the first client device over which to relay the second portion of the data flow. In some embodiments, based on the first and second historical information generated by the route predictor 630, the data relay manager 635 determines the second portion of the data flow.

In some embodiments, the data relay manager 635 directs additional access points to be utilized for data relay based on one or more handoff criteria 615*b* allocated in the memory 615. For example, in some embodiments, in response to determining that a second access point is associated with a higher communication performance metric than a first access point, the data relay manager 635 directs the second access point to be utilized for relay of portions of a data flow. Based on satisfaction of the one or more handoff criteria 615*b*, the data relay manager 635: directs the first access point to terminate the second wireless link with the second client device; directs a second access point to generate a third wireless link with the second client device; and directs the second access point to provide second metadata including a second set of relay instructions. The second set of relay instructions instructs the second client device to relay a third portion of the data flow between the second access point and the first client device via the third wireless link.

In some embodiments, the data relay manager 635 directs relay of portions of a data flow based on a common group identifier associated with certain client devices. In some embodiments, the data relay manager 635 obtains, from each of a subset of the plurality of client devices, the common group identifier. The subset of the plurality of client devices may include the first and second client devices. In response to obtaining the common group identifier, the data relay manager 635 designates each of the subset of the plurality of client devices as a candidate relay device. In some embodiments, the data relay manager 635, in response to determining satisfaction of the one or more relay criteria: directs the first access point to generate a third wireless link with a particular candidate relay device, and directs the first access point to provide second metadata including a second set of relay instructions. The second set of relay instructions instructs the particular candidate relay device to relay a third portion of the data flow between the first access point and the first client device via the third wireless link.

In some embodiments, an encryption manager 640 operates in conjunction with the data relay manager 635 in order to encrypt data to be relayed. In some embodiments, the encryption manager 640 sets a particular data relay encryption level for each of a subset of the plurality of client devices associated with a common group identifier. In some embodiments, the data relay manager 635 directs one or more access points to provide respective relay instructions that instruct the subset of the plurality of client device(s) to relay respective portions of the data flow according to the particular data relay encryption level.

Figure 7:
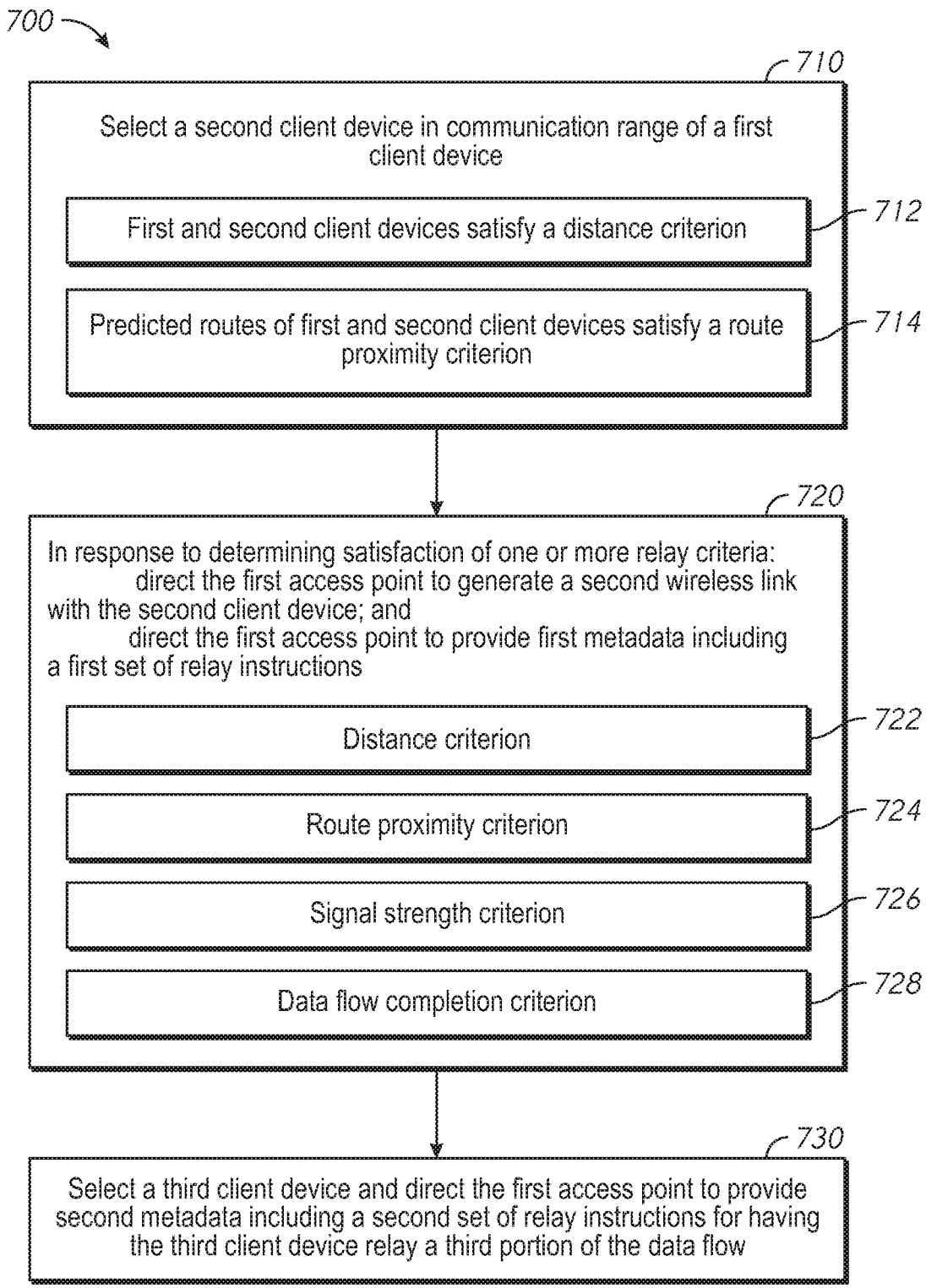
FIG. 7 is a flowchart representation of a method of scheduling relay of traffic between an access point and client devices in accordance with some embodiments.

FIG. 7 is a flowchart representation of a method 700 of scheduling relay of traffic between an access point and client devices in accordance with some embodiments. In various embodiments, the method 700 is performed by a traffic scheduler, such as a combination of one or more of the traffic scheduler 210 in FIG. 2, the traffic scheduler 310 in FIG. 3, the traffic scheduler 410 in FIG. 4, the distributed traffic scheduler 510 in FIG. 5, and/or the traffic scheduler 600 in FIG. 6. Briefly, the method 700 includes scheduling relay of a portion of a data flow to a first client device through a second client device, based on satisfaction of one or more relay criteria.

To that end, as represented by block 710, the method 700 includes selecting a second client device from a plurality of client devices. The second client device is located in communication range of a first client device of the plurality of client devices. The first client device is communicating a first portion of a data flow, via a first wireless link, with a first access point of one or more access points. In some embodiments, the first and the second client device are proximate to each other, such as being housed within respective vehicles driving behind or beside each other the same road. The data flow may include upstream (from the client device, such as proving credentials to a cloud server) and/or downstream (to the client device, such as obtaining traffic updates) communications.

In some embodiments, as represented by block 712, selecting the second client device includes: obtaining first location information that indicates a location of the first client device, and obtaining second location information that indicates a location of the second client device; and determining that the first location information and the second location information collectively indicate that a distance between the first and second client devices satisfies a distance criterion. For example, in some embodiments, the location information corresponds to information obtained from a global position system (GPS), such from respective GPS sensors included within the first and second client devices. As another example, in some embodiments, the location information is obtained from an entity separate from the client devices, such as from a radar system. In some embodiments, the communication frequency associated with the location information is lower than the communication frequency associated with the data flow between access points(s) and client device(s). As one example, with reference to FIG. 2, respective location information about the first and second client devices indicate that twenty meters separate the first and second client devices, and based on the location information, the traffic scheduler 210 selects the second client device 130-2 because five meters is an appropriate communication distance.

In some embodiments, as represented by block 714, selecting the second client device includes: determining a first predicted route for the first client device based on first historical information about the first location information; determining a second predicted route for the second client device based on second historical information about the second location information; and determining that the first and second predicted routes satisfy a route proximity criterion. In some embodiments, the method 700 includes determining the first historical information about the first location information based on changes in the first location information; and determining the second historical information about the second location information based on changes in the second location information. As one example, with reference to FIG. 3, based on the first and second historical information, the traffic scheduler 310 determines that the first and second client devices have been moving in approximately the same direction, such as going the same direction on a highway. Therefore, the traffic scheduler 310 selects the second client device 130-2 because the first and second client devices are likely to continue to stay within proximity of each other in the near future.

As represented by block 720, the method 700 includes, in response to determining satisfaction of one or more relay criteria: directing the first access point to generate a second wireless link with the second client device; and directing the first access point to provide first metadata including a first set of relay instructions. The first set of relay instructions instructs the second client device to relay a second portion of the data flow between the first access point and the first client device via the second wireless link. In some embodiments, the method 700 includes determining the second portion of the data flow based on the first portion of the data flow, first historical information about first location information, and second historical information about second location information. In some embodiments, the first set of relay instructions instructs the second client device to establish a communication link with the first client device over which to relay the second portion of the data flow.

As represented by block 722, in some embodiments, the one or more relay criteria include a distance criterion, as discussed above with reference to block 712. In some embodiments, the distance criterion is based on distance(s) between client devices, distance(s) between access point(s) and client device(s), or a combination thereof.

As represented by block 724, in some embodiments, the one or more relay criteria include a route proximity criterion, as discussed above with reference to block 714.

As represented by block 726, in some embodiments, the one or more relay criteria include a signal strength criterion. In some embodiments, the signal strength criterion is based on signal strength levels (e.g., RSSI) between client device(s) and access point(s). In some embodiments, the signal strength criterion is based relative signal strength levels. For example, with reference to FIG. 2, the traffic scheduler 210 obtains a first strength level indicator indicating a 10 dBm (decibel milliwatt) signal strength between the first client device 130-1 and the first access point 120-1, and obtains a signal second strength level indicator indicating a 100 dBm between the second client device 130-2 and the first access point 120-1. Due to the disparity of the signal strengths, in some embodiments, the traffic scheduler 210 determines that the first client device 130-1 will soon be out of range of the wireless coverage area provided by the first access point 120-1, whereas the second client device 130-2 will remain in range for some significant amount of time. Accordingly, the traffic scheduler 210 directs the first access point 120-1 and the second client device 130-2 to establish a second wireless link in order to enable the second client device 130-2 to relay portions of the data flow to the first client device 130-1.

As represented by block 728, in some embodiments, the one or more relay criteria include a data flow completion criterion. In some embodiments, the data flow completion criterion corresponds to a percentage of the data flow that the first client device and the first access point have completed communicating or remain to be communicated. In some embodiments, the data flow completion criterion corresponds to an amount of data (in absolute terms, such as 5 Gigabits) that has been communicated or remains to be communicated between the first client device and the first access point. In some embodiments, the data flow completion criterion operates in conjunction with other criteria of the one or more relay criteria. For example, with reference to FIG. 3, in response to determining that the first client device 130-1 and the first access point 120-1 have communicated 95% of the data flow and that an obtained RSSI indicates that signals received at the first access point 120-1 from the first client device 130-1 are strong, the traffic scheduler 210 forgoes scheduling the second client device 130-2 to relay portions of the data flow to the second client device (e.g., does not direct establishment of the second wireless link). On the other hand, if the traffic scheduler 210 predicts, based on historical location information, that the first client device 130-1 will imminently be out of coverage area of the first access point 120-1, and a large amount of data remains to be communicated between the first client device 130-1 and the first access point 120-1, then the traffic scheduler 210 schedules the second client device 130-2 to relay portions of the data flow to the first client device 130-1.

As represented by block 730, in some embodiments, the method 700 includes selecting a third client device; and in response to determining satisfaction of the one or more relay criteria: directing the first access point to generate a third wireless link with the third client device; and directing the first access point to provide second metadata including a second set of relay instructions. The second set of relay instructions instructs the third client device to relay a third portion of the data flow between the first access point and the first client device via the third wireless link. For example, with reference to FIG. 3, the traffic scheduler 310 schedules the third client device 130-3 to relay a portion of the data flow to the first client device 130-1. In some embodiments, the traffic scheduler 310 schedules the third client device 130-3 to relay the portion of the data flow directly to the first client device 130-1. In some embodiments, the traffic scheduler 310 schedules the third client device 130-3 to relay the portion of the data flow to the first client device 130-1 via the second client device 130-2. In some embodiments, the traffic scheduler 310 schedules the third client device 130-3 to relay a portion of the data flow directly to the first client device 130-1 and another portion to the first client device 130-1 via the second client device 130-2. According to various embodiments, the traffic scheduler 310 determines how to instruct the third client device 130-3 to relay the portion of the data flow based on a number of factors previously discussed, such as relative signal strength levels, location information, predicted routes, etc.

Figure 8:
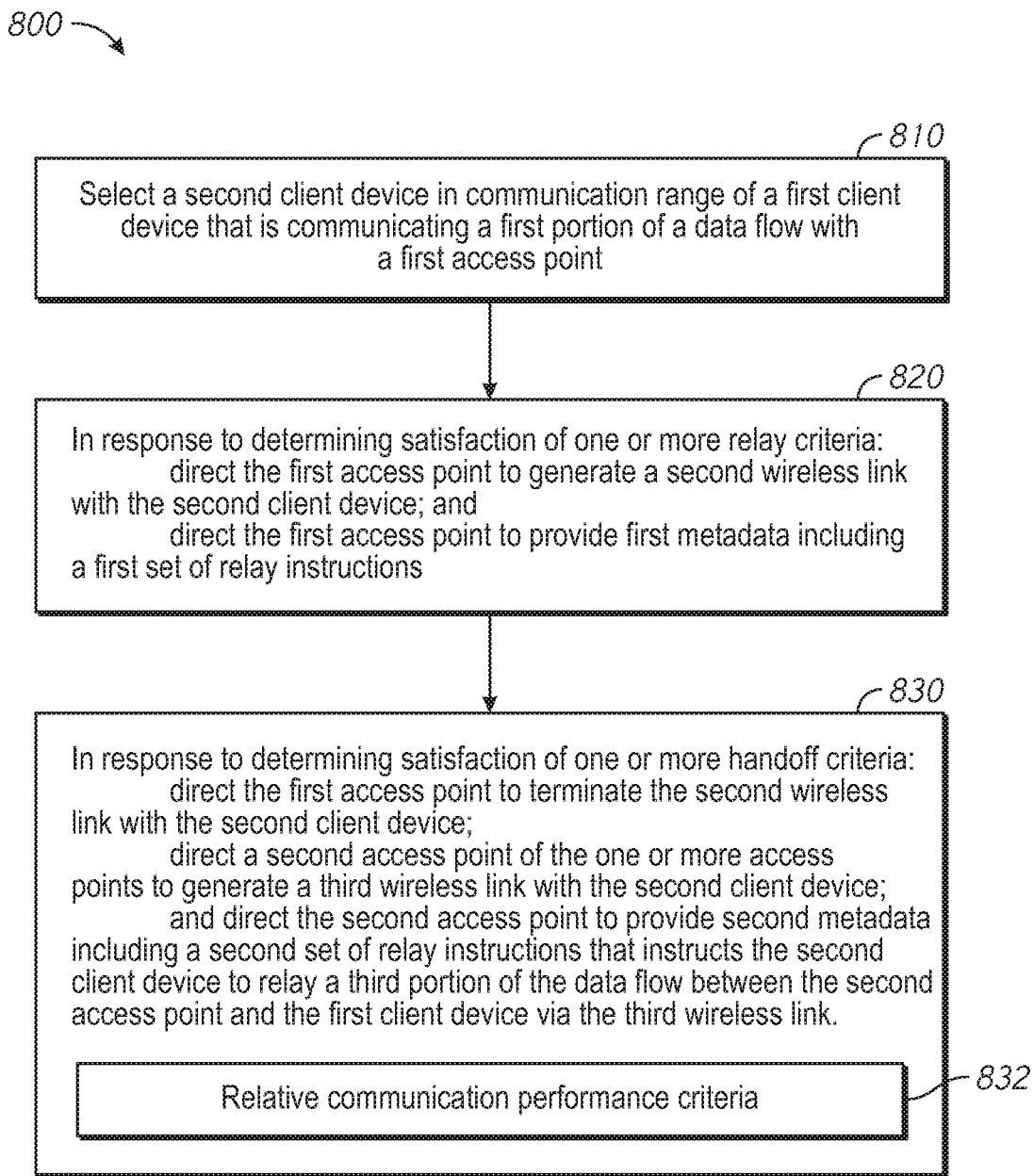
FIG. 8 is a flowchart representation of a method of utilizing multiple access points for scheduling relay of traffic accordance with some embodiments.

FIG. 8 is a flowchart representation of a method 800 of utilizing multiple access points for scheduling relay of traffic accordance with some embodiments. In various embodiments, the method 800 is performed by a traffic scheduler, such as a combination of one or more of the traffic scheduler 210 in FIG. 2, the traffic scheduler 310 in FIG. 3, the traffic scheduler 410 in FIG. 4, the distributed traffic scheduler 510 in FIG. 5, and/or the traffic scheduler 600 in FIG. 6. Briefly, the method 800 includes selecting multiple access points for facilitating relaying of traffic between a first client device and a second client device.

To that end, as represented by block 810, the method 800 includes selecting a second client device from a plurality of client devices. The second client device is located in communication range of a first client device of the plurality of client devices. The first client device is communicating a first portion of a data flow, via a first wireless link, with a first access point of one or more access points.

As represented by block 820, the method 800 includes, in response to determining satisfaction of one or more relay criteria: directing the first access point to generate a second wireless link with the second client device; and directing the first access point to provide first metadata including a first set of relay instructions. The first set of relay instructions instructs the second client device to relay a second portion of the data flow between the first access point and the first client device via the second wireless link.

As represented by block 830, in some embodiments, the method 800 includes in response to determining satisfaction of one or more handoff criteria: directing the first access point to terminate the second wireless link with the second client device; directing a second access point to generate a third wireless link with the second client device; and directing the second access point to provide second metadata including a second set of relay instructions. The second set of relay instructions instructs the second client device to relay a third portion of the data flow between the second access point and the first client device via the third wireless link. For example, with reference to FIG. 4, in response to determining satisfaction of the one more handoff criteria, the traffic scheduler 410 directs the second access point 120-2 to be utilized for relaying portions of the data flow, including directing the second access point 120-2 to establish a wireless link with the second client device 130-2 and directing the first access point 120-1 to terminate the existing wireless link with the second client device 130-2.

In some embodiments, the one or more handoff criteria include relative communication performance criteria corresponding to access points. Examples of relative communication performance criteria include, but are not limited to: relative bandwidth and/or throughput levels associated with the access points, relative signal strength levels between client device(s) and access point(s), relative signal to noise ratios (SNRs) with respect to client device(s) and access point(s), relative bit error rates (BERs) with respect to client device(s) and access point(s), and/or the like. As one example, with reference to FIG. 4, the traffic scheduler 410 determines a low signal strength level between the first access point 120-1 and the second client device 130-2, due to, for example, a physical obstruction 430. The traffic scheduler 410 detects a greater signal strength level between that the second access point 120-2 and the second client device 130-2. The traffic scheduler 410, therefore, initiates a handoff procedure from a wireless link between the first access point 120-1 and the second client device 130-2 to a wireless link between the second access point 120-2 and the second client device 130-2.

FIG. 9 is a flowchart representation of a method 900 of utilizing a common group identifier in scheduling relay of traffic accordance with some embodiments. In various embodiments, the method 900 is performed by a traffic scheduler, such as a combination of one or more of the traffic scheduler 210 in FIG. 2, the traffic scheduler 310 in FIG. 3, the traffic scheduler 410 in FIG. 4, the distributed traffic scheduler 510 in FIG. 5, and/or the traffic scheduler 600 in FIG. 6. Briefly, the method 900 includes obtaining a common group identifier from a number of client devices and scheduling relay of traffic based on the common group identifier.

To that end, as represented by block 910, in some embodiments, method 900 includes obtaining, from each of a subset of the plurality of client devices, a common group identifier. In some embodiments, the subset of the plurality of client devices includes first and second client devices. In some embodiments, the common group identifier corresponds to one of a vendor identifier (e.g., semi-trucks owned by the same company), service provider identifier (e.g., same cellular network provider), vehicle manufacturer identifier, vehicle model identifier, and/or the like. In some embodiments, the common group identifier identifies a caravan or platoon of related vehicles. For example, in some embodiments, the common group identifier identifies a platoon of semi-trucks each equipped with dedicated short-range communications (DSRC) capabilities that enable relay of portions of a data flow between the semi-trucks. In some embodiments, the common group identifier identifies a particular type of vehicle (e.g., a particular model of car) to which recall information is relayed.

As represented by block 920, in some embodiments, method 900 includes, in response to obtaining the common group identifier, designating each of the subset of the plurality of client devices as a candidate relay device. As one example, with reference to FIG. 3, the traffic scheduler 310 obtains a common group identifier from the second client device 130-2 and the third client device 130-3, and accordingly designates the second client device 130-2 and the third client device 130-3 as respective candidate relay devices.

As represented by block 930, in some embodiments, method 900 includes setting a particular data relay encryption level for each of the candidate relay devices. In some embodiments, setting the particular data relay encryption level includes providing a common encryption key to each of the candidate relay devices. One of ordinary skill in the art will appreciate that any type of encryption may be utilized, such as over the air (OTA) encryption (e.g., standard Wi-Fi Protected Access (WPA) ⅔ encryption). Moreover, in some embodiments, the nature of the relay scheme informs the encryption mechanism. For example, broadcast or multicast distribution may include public information (e.g., road conditions), and therefore a broadcast key is utilized. As another example, more sensitive information is encrypted using a more secure key, such as by distributing a peer group key to members of a platoon.

As represented by block 940, the method 900 includes selecting a second client device from a plurality of client devices. The second client device is located in communication range of a first client device of the plurality of client devices. The first client device is communicating a first portion of a data flow, via a first wireless link, with a first access point of one or more access points.

As represented by block 950, the method 900 includes, in response to determining satisfaction of one or more relay criteria: directing the first access point to generate a second wireless link with the second client device that is identified by the common group identifier; and directing the first access point to provide first metadata including a first set of relay instructions. The first set of relay instructions instructs the second client device to relay a second portion of the data flow between the first access point and the first client device via the second wireless link according to the particular data relay encryption level. As one example, with reference to FIG. 3, after obtaining the common group identifier from the first client device 130-1 and the third client device 130-3, the traffic scheduler 310 generates a common encryption key and distributes the common encryption key to the first client device 130-1 and the second client device 130-3. Therefore, when the third client device 130-3 relays portions of an encrypted data flow to the first client device 130-1 via the second client device 130-2, the second client device 130-2 is unable to decipher the encrypted data flow because the second client device 130-2 was not provided the common encryption key.

Figure 10:
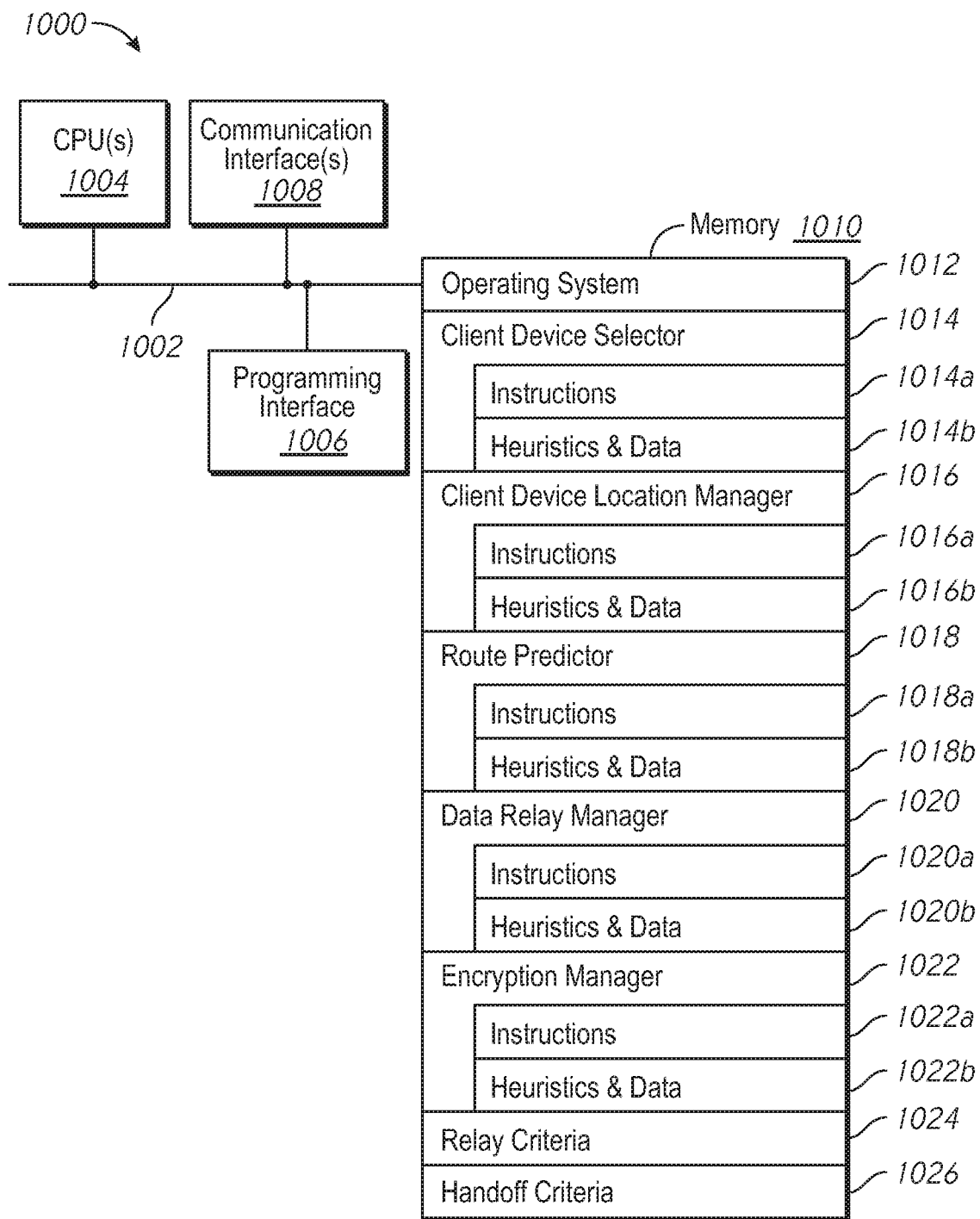
FIG. 10 is a system level diagram of a traffic scheduler in accordance with some embodiments.

FIG. 10 is a system level diagram of a traffic scheduler 1000 in accordance with some embodiments. In various embodiments, the traffic scheduler 1000 is similar to and adapted from one or more of: the traffic scheduler 210 in FIG. 2, the traffic scheduler 310 in FIG. 3, the traffic scheduler 410 in FIG. 4, the distributed traffic scheduler 510 in FIG. 5, and/or the traffic scheduler 600 in FIG. 6. While certain specific features are illustrated, those skilled in the art will appreciate from the present disclosure that various other features have not been illustrated for the sake of brevity, and so as not to obscure more pertinent aspects of the embodiments disclosed herein.

To that end, as a non-limiting example, in some embodiments, the traffic scheduler 1000 includes one or more processing units (CPUs) 1004, one or more communication interfaces 1008, a memory 1010, a programming (I/O) interface 1006, and one or more communication buses 1002 for interconnecting these and various other components. In some embodiments, the one or more communication buses 1002 include circuitry that interconnects and controls communications between system components.

The memory 1010 may include high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. The memory 1010 optionally includes one or more storage devices remotely located from the one or more CPUs 1004. the memory 1010 includes a non-transitory computer readable storage medium. In some embodiments, the memory 1010 or the non-transitory computer readable storage medium of the memory 1010 stores the following programs, modules and data structures, or a subset thereof: an optional operating system 1012, a client device selector 1014, a client device location manager 1016, a route predictor 1018, a data relay manager 1020, and an encryption manager 1022.

The operating system 1012 includes procedures for handling various basic system services and for performing hardware dependent tasks.

In some embodiments, the client device selector 1014 is configured to select a second client device from a plurality of client devices. The second client device is located in communication range of a first client device of the plurality of client devices. The first client device is communicating a first portion of a data flow, via a first wireless link, with a first access point of one or more access points. In some embodiments, the client device selector 1014 is configured to select the second client device based on determining that the first location information and the second location information collectively indicate that a distance between the first and second client devices satisfies a distance criterion. In some embodiments, the client device selector 1014 is configured to select the second client device based on determining that the first and second predicted routes satisfy a route proximity criterion. To that end, in various embodiments, the client device selector 1014 includes instructions and/or logic 1014a and heuristics and metadata 1014b.

In some embodiments, the client device location manager 1016 is configured to obtain first location information that indicates a location of the first client device, and obtain second location information that indicates a location of the second client device. To that end, in various embodiments, the client device location manager 1016 includes instructions and/or logic 1016a and heuristics and metadata 1016b.

In some embodiments, the route predictor 1018 is configured to determine a first predicted route for the first client device based on first historical information about the first location information, and determine a second predicted route for the second client device based on second historical information about the second location information. To that end, in various embodiments, the route predictor 1018 includes instructions and/or logic 1018a and heuristics and metadata 1018b.

In some embodiments, the data relay manager 1020 is configured to, in response to determining satisfaction of one or more relay criteria: direct the first access point to generate a second wireless link with the second client device in response to determining satisfaction of one or more relay criteria; and direct the first access point to provide first metadata including a first set of relay instructions. The first set of relay instructions instructs the second client device to relay a second portion of the data flow between the first access point and the first client device via the second wireless link. In some embodiments, the data relay manager 1020 is configured to obtain, from each of a subset of the plurality of client devices, a common group identifier, wherein the subset of the plurality of client devices includes the first and second client devices; and in response to obtaining the common group identifier, designate each of the subset of the plurality of client devices as a candidate relay device. To that end, in various embodiments, the data relay manager 1020 includes instructions and/or logic 1020a and heuristics and metadata 1020b.

In some embodiments, the encryption manager 1022 is configured to set a particular data relay encryption level for candidate relay devices. To that end, in various embodiments, the encryption manager 1022 includes instructions and/or logic 1022a and heuristics and metadata 1022b.

Moreover, FIG. 10 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first network could be termed a second network, and, similarly, a second network could be termed a first network, which changing the meaning of the description, so long as all occurrences of the "first network" are renamed consistently and all occurrences of the "second network" are renamed consistently. The first network and the second network are both networks, but they are not the same networks.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to selecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon selecting" or "in response to selecting" that the stated condition precedent is true, depending on the context.

What is claimed is:

1. A method comprising:
at a traffic scheduler including one or more processors, a non-transitory memory, and one or more communication interfaces, wherein the traffic scheduler is communicatively coupled to one or more access points:
    selecting a second client device from a plurality of client devices, wherein the second client device is located in communication range of a first client device of the plurality of client devices, wherein the first client device is communicating a first portion of a data flow, via a first wireless link, with a first access point of the one or more access points, wherein selecting the second client device further comprises:
        determining a first predicted route for the first client device based on historical information relating to a location of the first client device;
        determining a second predicted route for the second client device based on historical information relating to a location of the second client device; and
        determining that the first and second predicted routes satisfy a route proximity criterion; and
    in response to determining satisfaction of one or more relay criteria:
        directing the first access point to generate a second wireless link with the second client device; and
        directing the first access point to provide first metadata including a first set of relay instructions, wherein the first set of relay instructions instructs the second client device to relay a second portion of the data flow between the first access point and the first client device via the second wireless link.

2. The method of claim 1, wherein the first set of relay instructions instructs the second client device to establish a communication link with the first client device over which to relay the second portion of the data flow.

3. The method of claim 1, further comprising:
    selecting, from the plurality of client devices, a third client device; and
    in response to determining satisfaction of the one or more relay criteria:
        directing the first access point to generate a third wireless link with the third client device; and
        directing the first access point to provide second metadata including a second set of relay instructions, wherein the second set of relay instructions instructs the third client device to relay a third portion of the data flow between the first access point and the first client device via the third wireless link.

4. The method of claim 3, wherein the second set of relay instructions instructs the third client device to relay the third portion of the data flow to the first client device via the second client device.

5. The method of claim 1, further comprising:
    in response to determining satisfaction of one or more handoff criteria:
        directing the first access point to terminate the second wireless link with the second client device;
        directing a second access point of the one or more access points to generate a third wireless link with the second client device; and
        directing the second access point to provide second metadata including a second set of relay instructions, wherein the second set of relay instructions instructs the second client device to relay a third portion of the data flow between the second access point and the first client device via the third wireless link.

6. The method of claim 1, wherein selecting the second client device that is located in communication range of the first client device includes:
    obtaining first location information that indicates the location of the first client device, and obtaining second location information that indicates the location of the second client device; and
    determining that the first location information and the second location information collectively indicate that a distance between the first and second client devices satisfies a distance criterion.

7. The method of claim 6, further comprising:
    determining the historical information relating to the location of the first client device based on changes in the first location information; and
    determining the historical information relating to the location of the second client device based on changes in the second location information.

8. The method of claim 7, further comprising, determining the second portion of the data flow based on the first portion of the data flow, the historical information relating to the location of the first client device, and the historical information relating to the location of the second client device.

9. The method of claim 1, further comprising:
    obtaining, from each of a subset of the plurality of client devices, a common group identifier, wherein the subset of the plurality of client devices includes the first and second client devices; and
    in response to obtaining the common group identifier, designating each of the subset of the plurality of client devices as a candidate relay device.

10. The method of claim 9, further comprising, setting a particular data relay encryption level for each of the candidate relay devices,
    wherein the first set of relay instructions instructs the second client device to relay the second portion of the data flow between the first access point and the first client device according to the particular data relay encryption level.

11. The method of claim 9, further comprising, in response to determining satisfaction of the one or more relay criteria:
  directing the first access point to generate a third wireless link with a particular candidate relay device; and
  directing the first access point to provide second metadata including a second set of relay instructions, wherein the second set of relay instructions instructs the particular candidate relay device to relay a third portion of the data flow between the first access point and the first client device via the third wireless link.

12. The method of claim 1, wherein the one or more relay criteria include one or more of: a distance criterion, a route proximity criterion, a signal strength criterion, or a data flow completion criterion.

13. A traffic scheduler comprising:
  one or more processors;
  one or more communication interfaces; and
  a non-transitory memory including instructions, which, when executed by the one or more processors, cause the traffic scheduler to:
    select a second client device from a plurality of client devices, wherein the second client device is located in communication range of a first client device of the plurality of client devices, wherein the first client device is communicating a first portion of a data flow, via a first wireless link, with a first access point of one or more access points, wherein selecting the second client device further comprises:
      determining a first predicted route for the first client device based on historical information relating to a location of the first client device;
      determining a second predicted route for the second client device based on historical information relating to a location of the second client device; and
      determining that the first and second predicted routes satisfy a route proximity criterion; and
    in response to determining satisfaction of one or more relay criteria:
      direct the first access point to generate a second wireless link with the second client device; and
      direct the first access point to provide first metadata including a first set of relay instructions, wherein the first set of relay instructions instructs the second client device to relay a second portion of the data flow between the first access point and the first client device via the second wireless link.

14. The traffic scheduler of claim 13, wherein the traffic scheduler, in response to determining satisfaction of one or more handoff criteria:
  directs the first access point to terminate the second wireless link with the second client device;
  directs a second access point of the one or more access points to generate a third wireless link with the second client device; and
  directs the second access point to provide second metadata including a second set of relay instructions, wherein the second set of relay instructions instructs the second client device to relay a third portion of the data flow between the second access point and the first client device via the third wireless link.

15. The traffic scheduler of claim 13, wherein the traffic scheduler:
  obtains first location information that indicates the location of the first client device, and obtains second location information that indicates the location of the second client device, wherein the traffic scheduler selects the second client device based on determining that the first location information and the second location information collectively indicate that a distance between the first and second client devices satisfies a distance criterion.

16. The traffic scheduler of claim 13, wherein the traffic scheduler:
  obtains, from each of a subset of the plurality of client devices, a common group identifier, wherein the subset of the plurality of client devices includes the first and second client devices; and
  in response to obtaining the common group identifier, designates each of the subset of the plurality of client devices as a candidate relay device.

17. The traffic scheduler of claim 16, wherein the traffic scheduler sets a particular data relay encryption level for each of the candidate relay devices, and wherein the first set of relay instructions instructs the second client device to relay the second portion of the data flow between the first access point and the first client device according to the particular data relay encryption level.

18. A non-transitory computer readable medium storing one or more programs, the one or more programs including instructions, which, when executed by one or more processors of a traffic scheduler, cause the traffic scheduler to:
  select a second client device from a plurality of client devices, wherein the second client device is located in communication range of a first client device of the plurality of client devices, wherein the first client device is communicating a first portion of a data flow, via a first wireless link, with a first access point of one or more access points; and
  in response to determining satisfaction of one or more relay criteria:
    direct the first access point to generate a second wireless link with the second client device; and
    direct the first access point to provide first metadata including a first set of relay instructions, wherein the first set of relay instructions instructs the second client device to relay a second portion of the data flow between the first access point and the first client device via the second wireless link, wherein the traffic scheduler sets a particular data relay encryption level for each of a plurality of candidate relay devices, the plurality of candidate relay devices including the first client device and the second client device, and wherein the first set of relay instructions instructs the second client device to relay the second portion of the data flow between the first access point and the first client device according to the particular data relay encryption level.

* * * * *